United States Patent
Hutchings et al.

(10) Patent No.: US 9,451,313 B2
(45) Date of Patent: Sep. 20, 2016

(54) NETWORK MEDIA ADAPTER

(75) Inventors: Jeffrey L. Hutchings, Lehi, UT (US);
Aaron Gelter, West Jordan, UT (US);
Craig Gunther, Salt Lake City, UT (US)

(73) Assignee: Harman International Industries, Incorporated, Northridge, CA (US)

( * ) Notice: Subject to any disclaimer, the term of this patent is extended or adjusted under 35 U.S.C. 154(b) by 1184 days.

(21) Appl. No.: 13/172,464

(22) Filed: Jun. 29, 2011

(65) Prior Publication Data
US 2013/0003863 A1    Jan. 3, 2013

(51) Int. Cl.
H04L 12/857 (2013.01)
H04N 21/418 (2011.01)
H04N 21/43 (2011.01)
H04N 21/436 (2011.01)
H04N 21/4363 (2011.01)
H04L 12/853 (2013.01)

(52) U.S. Cl.
CPC ...... H04N 21/4183 (2013.01); H04N 21/4305 (2013.01); H04N 21/4363 (2013.01); H04N 21/43615 (2013.01)

(58) Field of Classification Search
None
See application file for complete search history.

(56) References Cited

U.S. PATENT DOCUMENTS

| | | | |
|---|---|---|---|
| 7,215,637 B1 * | 5/2007 | Ferguson | H04L 45/00 370/230.1 |
| 7,461,282 B2 * | 12/2008 | Cheung | H04N 21/4302 348/513 |
| 2003/0135860 A1 | 7/2003 | Dureau | |
| 2004/0001591 A1 | 1/2004 | Mani et al. | |
| 2004/0100942 A1 | 5/2004 | Blank et al. | |
| 2004/0190459 A1 * | 9/2004 | Ueda | H04L 47/10 370/252 |
| 2006/0007943 A1 * | 1/2006 | Fellman | H04L 1/0045 370/400 |
| 2006/0088063 A1 * | 4/2006 | Hartung | H04L 43/087 370/498 |

(Continued)

FOREIGN PATENT DOCUMENTS

CN     101790886 A    7/2010
FR     2 948 526 A1    1/2011

(Continued)

OTHER PUBLICATIONS

A Clock Synchronization System with IEEE 1588-2008 Adapters over Existing Gigabit Ethernet Equipment. IEEE(2010). Han et al.*

(Continued)

*Primary Examiner* — Venkat Perungavoor
(74) *Attorney, Agent, or Firm* — Alleman Hall McCoy Russell & Tuttle LLP

(57) ABSTRACT

A network media adapter includes peripheral interfaces for connection to connectors of audio/video ("A/V") sources and sinks to respectively receive media data from the A/V sources and to transmit media data to the A/V sinks. Components are configured to syntonize or synchronize local media clocks of the A/V sources and sinks to ensure media data integrity affiliated with a protocol of a media network over which the media data is transported. A quality of service (QoS)-compliant media interface is integrated in the network media adapter through which to send and receive processed A/V media data to and from the media network according to the protocol. Other components may be configured to process, encapsulate, and transport over the media network the media data received from the A/V sources. Still other components may be configured to receive media data from the media network and decapsulate, process, and transmit the media data through one or more peripheral interfaces connected to the A/V sinks.

35 Claims, 4 Drawing Sheets

(56) References Cited

U.S. PATENT DOCUMENTS

| | | | | |
|---|---|---|---|---|
| 2006/0280182 | A1* | 12/2006 | Williams | H04J 3/0632 370/394 |
| 2008/0056145 | A1* | 3/2008 | Woodworth | H04L 67/306 370/252 |
| 2008/0120675 | A1 | 5/2008 | Morad et al. | |
| 2009/0109893 | A1* | 4/2009 | Gopal | H04L 65/80 370/315 |
| 2010/0215057 | A1* | 8/2010 | Frink | H04N 21/23608 370/474 |
| 2010/0235486 | A1* | 9/2010 | White | H04L 43/0858 709/223 |

FOREIGN PATENT DOCUMENTS

| | | |
|---|---|---|
| JP | 2005531245 A | 10/2005 |
| JP | 2010246146 A | 10/2010 |
| WO | 2008141341 A1 | 11/2008 |

OTHER PUBLICATIONS

Media Clock Sychronization based on PTP. Weibel et al. AES (Nov. 18-20, 2011).*

An adaptive protocol for sychronizing media streams. Rothermel et al. Multimedia Systems(1997).*

Clock-Aligned Reproduction of Group Media.Motorola(2010).*

AVB for Professional A/V Use. Kreifeldt, Rick. AVnu Alliance(2009).*

Intrastream Sychronization for Continuous Media Streams : A Survey of Playout Schedulers. Laoutaris et al. IEEE(2002).*

Intra and Inter-Stream Synchronisation for Stored Multimedia Streams. Biersack et al. IEEE(1996).*

"Ethernet AVB," retrieved May 4, 2011, from http://www.cs.ru.ac.za/research/g03F2534/EthernetAVG.html, 2 pages.

"Ethernet PHY Device Support: Ethernet PHY Device API," retrieved May 5, 2011, from http://labdasar.ee.itb.ac.id/lab/installer/embedded/ecos-3.0.cygwin/ecos-3.0/doc/html/ref/io- . . . , 2 pages.

Wikipedia, "S/PDIF," retrieved May 6, 2011, from http://en.wikipedia.org/wiki/S/PDIF, 4 pages.

Digital Connection, "What is HDCP (high definition copy protocol)?" retrieved May 6, 2011, from http://www.digitalconnection.com/faq/HDTV_12.asp (2 pages).

European Search Report for corresponding EP Application No. 12174275.3, 7 pages, dated Nov. 22, 2012.

European Patent Office, Communication pursuant to Article 94(3) EPC, Apr. 7, 2014, Germany, 6 pages.

* cited by examiner

NETWORK MEDIA ADAPTER

BACKGROUND OF THE INVENTION

1. Technical Field

The present disclosure relates generally to adapting audio/video (A/V) media devices to a network configuration, and more specifically, to a network media adapter including peripheral interfaces for connection to connectors of multiple A/V sources and A/V sinks and including processing that ensures media data integrity.

2. Related Art

In order to generate significant market pull in professional and consumer spaces of networked A/V media devices (such as BluRay or DVD players, cameras, etc.), an entire ecosystem of bridges, switches, routers, sources, and sinks need to be created that can properly communicate over a network with media data integrity. While streaming products will begin to emerge as standards or protocols solidify and application specific standard product (ASSP) manufacturers produce cost-effective solutions, there are millions of existing sources and sinks that cannot perform streaming across networks such as Ethernet Audio/Video Bridging (AVB), Transport Control Protocol/Internet Protocol (TCP/IP), MoCCA and the like without the use of a media on/off ramp.

SUMMARY

A media network adapter provides adaptation between legacy audio/video ("A/V") media sources and sinks. When media is referred to as audio/video media, the present disclosure intends to refer to audio media, video media, or a combination of audio and video media of any kind. Processing components provide the ability to receive audio and video data from consumer peripheral interfaces such as analog stereo audio, digital audio (S/PDIF or TOSLINK), high-definition multimedia interface (HDMI), and the like. In addition, both standard and high definition video can be received via video signal inputs such as composite, S-video, component analog interfaces and HDMI. Upon receiving the audio/video data, raw media data is processed, encapsulated, and transported over a media network using the appropriate protocols. Additional blocks are used to receive media streams (audio, video, and/or transport streams). When received, the raw media data is decapsulated, processed, and then transmitted out to one or more of the available consumer peripheral interfaces.

An example network media adapter includes peripheral interfaces for connection to connectors of A/V sources and sinks to respectively receive media data from the A/V sources and to transmit media data to the A/V sinks. Components are configured to synchronize and syntonize local media clocks of the A/V sources and sinks to ensure media data integrity affiliated with a protocol of a media network over which the media data is transported. A quality of service (QoS)-compliant media interface is integrated in the network media adapter through which to send and receive processed A/V media data to and from the media network according to the protocol. Other components may be configured to process, encapsulate, and transport over the media network the media data received from the A/V sources. Still other components may be configured to receive media data from the media network and decapsulate, process, and transmit the media data through one or more peripheral interfaces connected to the A/V sinks.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

By way of introduction, the present disclosure relates to a network media adapter including peripheral interfaces for connection to connectors of multiple audio/video ("A/V") sources and A/V sinks and including processing that ensures media data integrity. The network media adapter provides media data integrity at least in part through components configured to synchronize and syntonize clocks of the A/V sources and sinks to ensure (or what some protocols call "to guarantee") media data integrity affiliated with a protocol of the media network. That the clocks of the A/V sources and sinks are syntonized means that they match in frequency and that they are synchronized means they match in both frequency and phase. Media data integrity generally means that when the media data is transmitted over the network, there is no loss or corruption of the media data. In other words, the media data (audio and/or video) will play smoothly without jittering, clicks, pops, or video drop outs, and the like. The network media adapter may also include a quality of service (QoS)-compliant media interface through which to send and receive processed A/V media data to and from the media network over physical media such twisted pair cables or fiber, or over other communication media such as wireless network media, according to the protocol.

Figure 1:
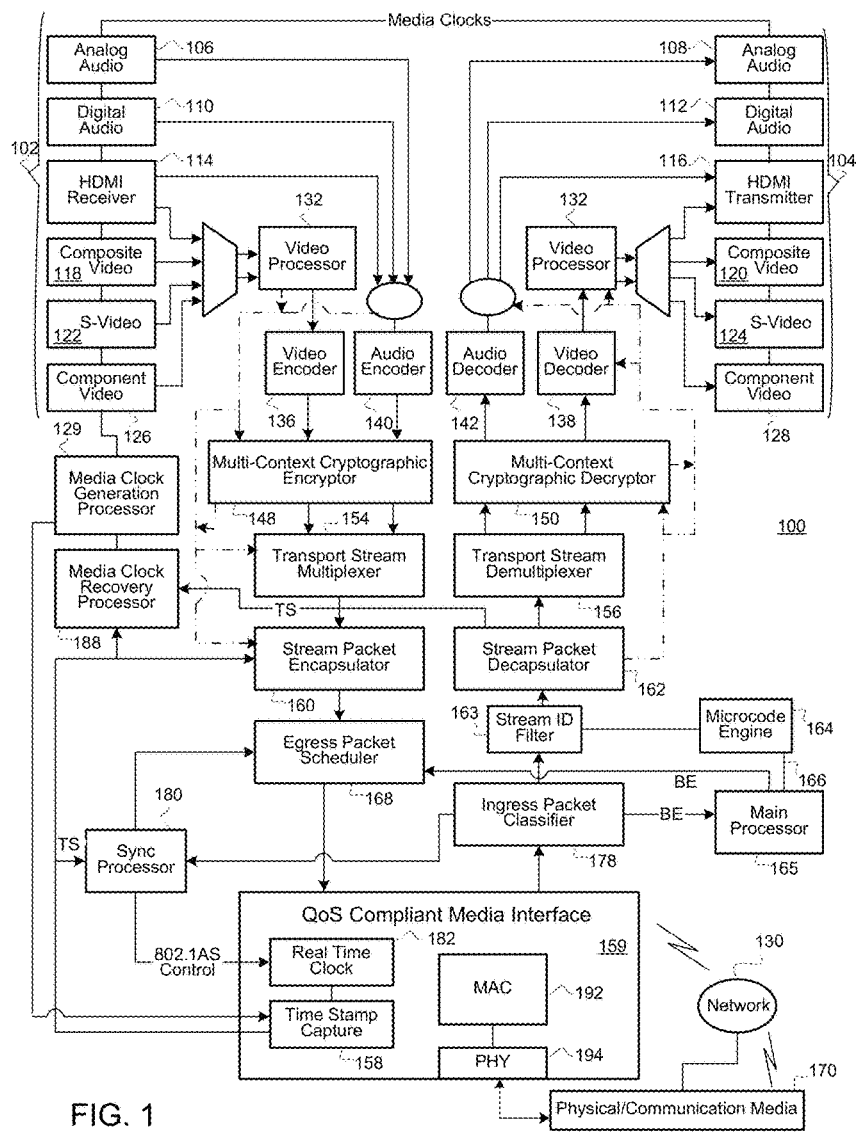
FIG. 1 is a block diagram of an example network media adapter.

FIG. 1 is a block diagram of an example network media adapter 100. The network media adapter 100 may be a separate stand alone device, such as in a separate enclosure dedicated to the network media adapter 100. Alternatively, the network media adapter 100 may be added to another device, as a component or module. The network media adapter 100 may include peripheral interfaces 102 and 104 to communicate with devices external to the network media adapter 100. Such peripheral interfaces 102 and 104 may include physical connections such as ports, connectors, fasteners and the like, and/or wireless connectivity, and corresponding communication protocols. A plurality of A/V source devices (or "sources") may include corresponding peripheral interfaces 102 and a plurality of A/V sink devices (or "sinks") may include corresponding peripheral interfaces 104 as well. Each interface 102 and 104 may provide for reception and transmission of common consumer audio and video. In other examples, the A/V devices may operate as both sources and sinks.

Figure 2:
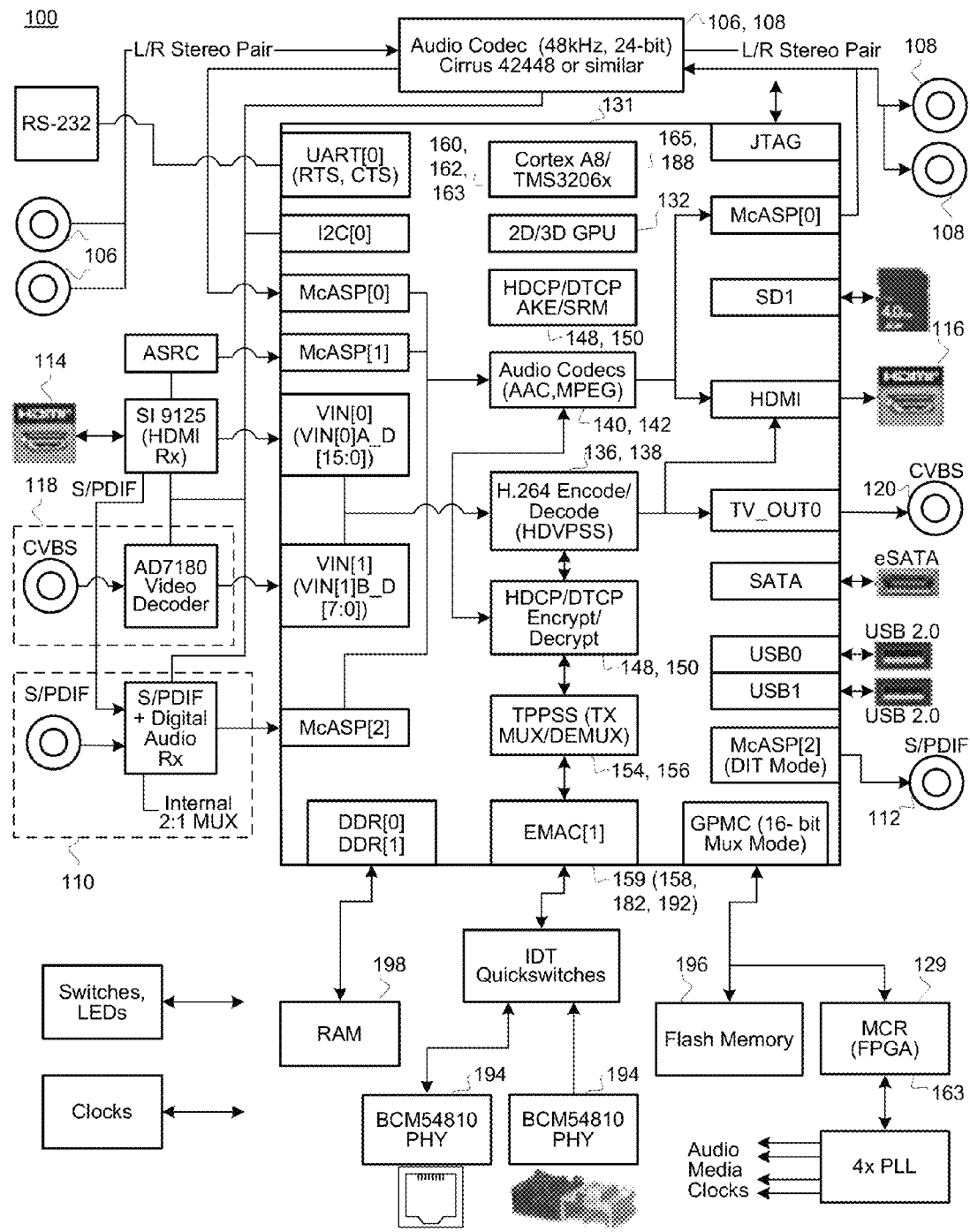
FIG. 2 is a block diagram of an example hardware implementation of the network media adapter of FIG. 1.
Figure 3:
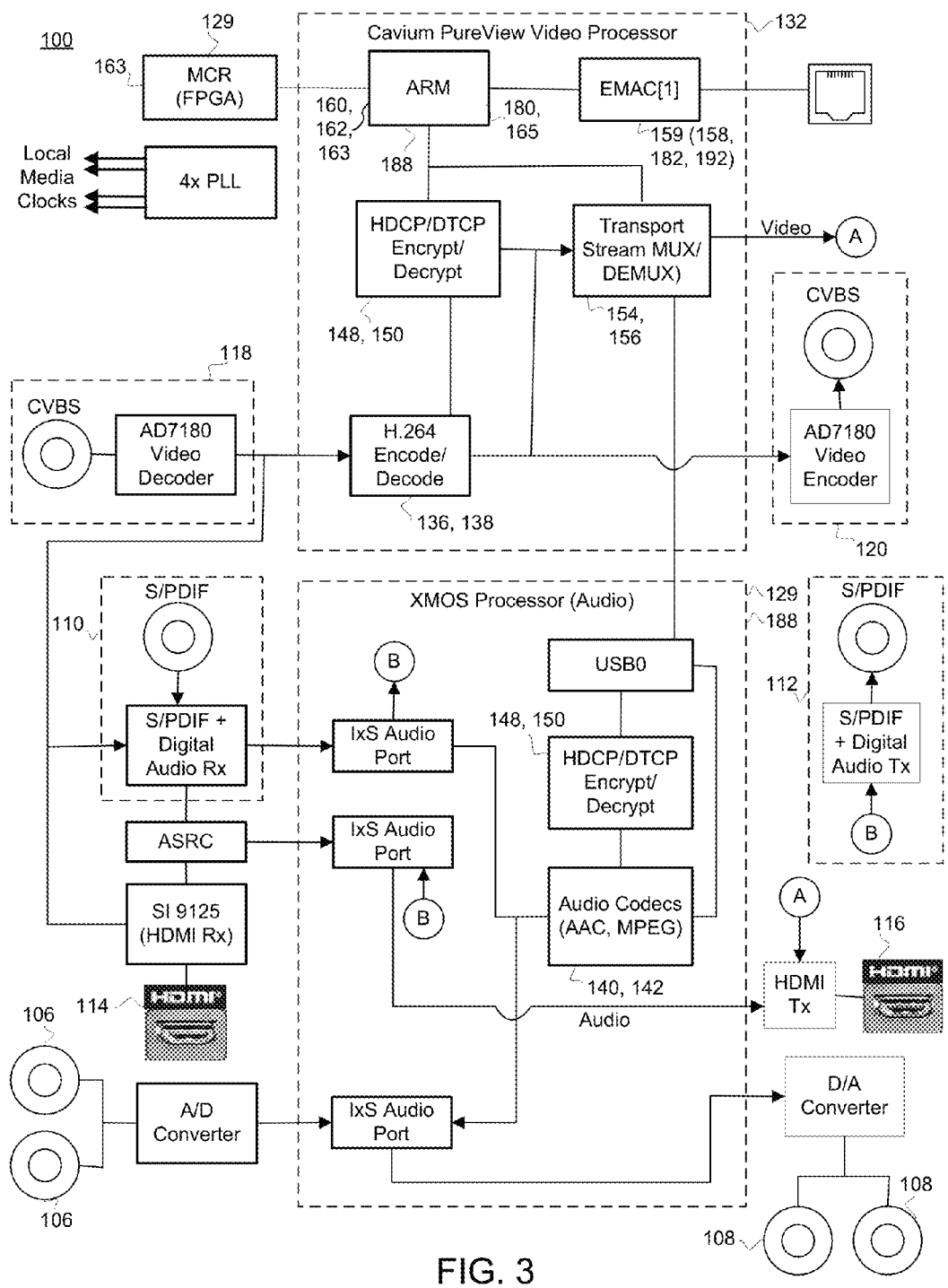
FIG. 3 is a block diagram of another example hardware implementation of the network media adapter of FIG. 1.

With additional reference to FIGS. 2-3, the peripheral interfaces 102 and 104 of FIG. 1 may include stereo audio connectors 106 (such as RCA-type connectors) for connection to an analog audio transmitter such as an AM/FM tuner, CD player, or MP3 player. Furthermore, additionally or alternatively, the interfaces 102 and 104 may include stereo audio connectors 108 for connection to an analog audio receiver such as a speaker. Similarly, additionally or alternatively, each interface 102 and 104 may include digital audio connectors 110 and 112, respectively for connection to a digital audio transmitter and/or a digital audio receiver. The digital audio connectors 110 and 112 may be of a stereo, multichannel raw format such as linear pulse-code modulation (LPCM) and/or other multichannel formats. The digital audio interconnectors 110 and 112 of FIGS. 2-3 are a predefined format, such as of an S/PDIF format, but any format may be used.

The interfaces 102 and 104 may alternatively or in addition include high-definition multimedia interface (HDMI) connectors 114 and/or 116, respectively for connection to an HDMI-capable transmitter and/or HDMI-capable receiver. The HDMI connectors 114 and 116 may include a high-speed serial interface for high definition video and audio. The interfaces 102 and 104 may further alternatively or additionally include composite video connectors 118 and/or 120, respectively for connection to a composite-video-capable transmitter and/or a composite-video-capable receiver. The composite video connectors 118 and 120 may be built on standard NTSC or PAL analog video interfaces via yellow RCA connectors. The interfaces 102 and 104 may further alternatively or additionally include S-video connectors 122 and/or 124, which are high-resolution analog video interface connectors that use multi-pin DIN connectors. The interfaces 102 and 104 may further alternatively or additionally include component video connectors 126 and/or 128, a high definition video interface using three RCA- or BNC-type connectors. Furthermore, alternatively or in addition to the analog audio connectors 106 and/or 108 and any analog video connector (such as composite video connectors 118 and/or 120 or S-video connectors 122 and/or 124), the interfaces 102 and 104 may include SCART (EIA Multiport) connectors as are still used in Europe. The SCART connectors combine analog audio and video signals and are common for connecting A/V equipment together. Other interfaces or connectors may be included although not shown, and therefore, the interfaces and connectors described are examples.

The network media adapter 100 may further include a media clock generation processor 129 that generates a local media clock for the media coming from the A/V sources to be encapsulated, processed, and transmitted over a communication medium of a network 130, which will be discussed in more detail. The combined media clock recovery and generation processor 129 and 188 ("MCR") is displayed in both implementations of the network media adapter 100 of FIGS. 2 and 3 as a device or component such as at least a field programmable gate array (FPGA). In other examples, the network media adapter, or parts of the network media adapter 100 may be a module. The term "module" or "component" may be defined to include one or more executable parts. As described herein, the modules or components are defined to include software, hardware or some combination thereof executable by a processor. Software modules may include instructions stored in memory that are executable by a processor. Hardware modules may include various devices, components, circuits, gates, circuit boards, and the like that are executable, directed, and/or controlled for performance by a processor.

The network media 100 adapter may include a system on a chip (SoC) 131 shown in FIG. 2 that may be configured and/or programmed to implement a large variety of A/V processing functions, including several—but not necessarily all—of those disclosed herein. The system on the chip 131 of FIG. 2 may be a component such as a DRA64x/65x or DM8214 of Texas Instruments of Dallas, Tex. The system on a chip 131 of FIG. 2 includes an initial hardware architecture that implements some of the peripheral interfaces 102 and 104 of FIG. 1, and adds others such as hard disk drives, USB, SD cards, and the like. Other types of such processors may be employed or a combination of more discrete hardware and/or programmable processors may be employed as described in the example implementation of FIG. 3.

The network media adapter 100 may further include one or more video processors 132 for processing raw video media. In the example implementation of FIG. 3, the Cavium PureView video processor of Cavium Networks of Mountain View, Calif. may be configured to execute the majority of the video processing as will be discussed later, the modules for which are displayed within the video processor 132 of FIG. 3. The video processor 132 of FIG. 3 may further be configured to implement other processing as well, including as related to clock recovery.

The network media adapter 100 may further include a video encoder 136 to compress video in up to a 100:1 compression ratio while maintaining high-definition quality. The network media adapter 100 may further include a video decoder 138 to decompress compressed video up to the same compression ratio in preparation to send the video to video receivers or other sinks. Different or additional ratios of compression are envisioned. The video encoder/decoder 136 and 138 (FIGS. 2-3) may be implemented in one chip, module, or instance within the network media adapter. The compression may be necessary, especially with high definition video and/or audio because at least some media interfaces impose bandwidth restrictions for streaming traffic. Even modest video resolutions require in excess of 200 megabits per second (Mbps) to transmit. Raw video, therefore, would rapidly consume the available bandwidth and so video compression is employed to maintain high quality while avoiding consumption of large amounts of bandwidth. The video encoder/decoder 136 and 138 enables the transport of multiple high-definition video streams over a streaming media network such as Ethernet AVB and the like. While video compression is often necessary, it is not always required and some video media (especially of the analog or low-definition type) may bypass the video encoder/decoder (dashed lines), making them optional.

The audio data received and sent through respective peripheral interfaces 102 and 104 follows similar paths to the video received and sent through the interfaces 102 and 104. The network media adapter 100 may therefore also include an audio encoder 140 to compress the audio to a predetermined level of compression. The network media adapter 100 may also include an audio decoder 142 to decompress the audio in preparation to send the audio to audio receivers or other sinks. The audio encoder 140 and the audio decoder 142 may be included on a single chip (FIG. 2), as a component, or as a single instance on a larger chip or implementation of the network media adapter 100.

The network media adapter 100 may further include a multi-context cryptographic encryptor 148 for optional content protection of video and audio received from the interface 102. A multi-context encryption engine of the encryptor 148 enables simultaneous support for multiple encryption standards. For example, HDMI content is protected using high-bandwidth digital content protection (HDCP). Thus, content that is received via HDMI is protected with HDCP. Other content, however, is mandated to use digital transmission content protection (DTCP) for content protection and copy management. These two standards use different operating modes of the AES-128 encryption standard. A multi-context encryption engine enables streaming of both DTCP and HDCP protected content. The encryption engine should have an aggregate throughput of at least the maximum expected data throughout being received and transmitted. Because the content protection is optional if the media need not be encrypted or protected, the multi-context encryption encryptor 148 may be bypassed. The various example alternative paths of the received and transmitted audio and video are shown in dashed lines indicating that the audio and/or video media data may not be processed by every processing component available within the network media adapter 100.

The network media adapter 100 may also include a multi-context cryptographic decryptor 150 to decrypt encoded media that comes from the network before the media can be decompressed (if necessary) and sent on to the receivers. The decryption format used is to match the format (e.g., HDCP, DTCP) with which the A/V media was originally encrypted. In FIG. 2, the HDCP/DTCP AKE/SRM 152 is a software implementation that works in conjunction with the HDCP/DTCP encryptor/decryptor 148 and 150 to perform the encryption and decryption tasks just described. The AKE/SRM portion of the label stands for authentication and key exchange (AKE) and system renewability message (SRM). In FIG. 3, the HDCP/DTCP AKE/SRM 152 is integrated in the functionality of the ARM processor after configuration of the ARM. The ARM is a general purpose, programmable processor capable of high performance computing. If incoming media is not encrypted, then the multi-context cryptographic decryptor 150 may be bypassed (dashed lines).

The network media adapter 100 may also include a transport stream multiplexer 154 to multiplex the compressed audio and the compressed video into a multi-program transport stream, e.g., IEC 13818. The network media adapter 100 may further include a transport stream demultiplexer 156 to demultiplex a plurality of packetized elementary streams (PES) found within a stream of ingress packets and process at least some of the PES down to an elementary stream, which are sent to the multi-context cryptographic decryptor 150 when encrypted. The multi-context cryptographic decryptor 150 may further be configured to decrypt each elementary stream with one of a plurality of copy protection standards.

The network media adapter 100 may also include a stream packet encapsulator 160 to receive timestamp data from a time stamp capture module 158 of a quality-of-service (QoS)-compliant media interface 159, and to encapsulate the transport stream into a media interface compliant packet stream, e.g., IEC 61883-4. At this point in the A/V media flow, the processed media is ready for transmission on a desired streaming network communication medium. The network media adapter 100 may also include a stream packet decapsulator 162 to decapsulate ingress packets of the media data and to send the decapsulated media data to the transport stream demultiplexer when in a transport stream, to the multi-context cryptographic decryptor when encrypted or protected, and/or to the audio and video decoders 138 and 142 when compressed.

The network media adapter 100 may also include a stream ID filter 163 with which to filter out source streams received from an ingress packet classifier 178 (further described later). There may be more streams being sent through the network 130 than the media adapter need process because some (or many) of the streams are destined for sinks not connected to a peripheral interface 104 of the media adapter 100. If the media adapter need not process identified stream(s), then the media adapter may ignore these stream(s). In one example, this is handled with subscriptions.

The stream ID filter 163 may include a component that determines whether the network media adapter 100 subscribes to a source stream identified by a stream ID in the header information of the source media stream. If the media adapter subscribes to a particular stream ID, then the media adapter 100 may generate a corresponding local media stream for further processing. Alternatively, if the media adapter is not subscribed to the particular stream ID, then the media adapter may not generate the corresponding local media stream.

The network media adapter 100 may also include a microcode engine 164, which may include a component that processes microcode or commands. The commands may be for subscribing or unsubscribing to transport streams. Alternatively or in addition, the commands may be for routing media stream samples associated with a particular stream ID to a particular one of the peripheral interfaces 104 that generates the corresponding local media stream.

The network media adapter 100 may also include a main processor 165, which may be in communication with the microcode engine 164 over a bus 166 or any other communication mechanism. The bus 166 may include an interface that transfers data between the processor 165 and the microcode engine 164. The bus 166 may include a data bus internal to a computing device, a parallel bus, a serial bus, a PLB (Processor Local Bus), or any other medium for transferring data between components.

During operation, the processor 165 may write commands to the microcode engine 164. For example, in response to the selection of a particular transport stream in a graphical user interface or other event, the processor 165 may write commands to the bus 166 which subscribe to the corresponding stream ID. Alternatively or in addition, in response to the selection of the particular stream in the graphical user interface, the processor 165 may write commands that unsubscribe from the corresponding stream ID. Alternatively or in addition, the processor 165 may read commands from the microcode engine 164 that were previously stored prior to writing new commands to the bus 166.

In order to subscribe to the stream ID, the processor 165 may determine the time domain of the corresponding source stream. The processor 165 may determine which one of the peripheral interfaces 104 is configured for the determined time domain. Each one of the peripheral interfaces may generate multiple local media streams from multiple source streams. Alternatively or in addition, each one of the peripheral interfaces may generate a single local media stream from multiple source streams.

Accordingly, the stream ID filter 163 may be configured to have N destination offsets corresponding to N possible source streams assigned to the network adapter 100. The processor 165 may further determine a destination offset value that identifies which one of the destination offsets corresponds to the source stream identified by the stream ID. In one example, the destination offset value may identify a location in an output block of a buffer in the media adapter 100 at which to write a media stream sample of the source stream. For example, the destination offset value may be a memory offset value or a number that may be used to determine the memory offset value. The processor 165 may write commands to the microcode engine 164 for subscribing to the stream ID and for routing any media stream samples for the stream ID to the appropriate destination offset of the appropriate peripheral interface 104. For example, the processor 165 may store the commands in a local memory buffer so that, subsequently, each time any time-stamped packet for the stream ID arrives, the microcode engine 164 may process the time-stamped packet appropriately.

In response to the main processor 165 writing one or more subscribe commands to the microcode engine 164, the microcode engine 164 may transmit the stream ID identified in the subscribe command to the stream ID filter 163. As a result, the stream ID filter 163 may store the stream ID as a subscribed media stream identifier and later identify the subscribed media stream identifier when requested. In one example, the microcode engine 164 may also provide the stream ID filter 163 with an identification of the commands that route the subscribed media stream to the appropriate destination offset of the appropriate peripheral interface. Further examples of subscription-based stream processing and affiliated features are described in U.S. patent application Ser. No. 13/023,989, entitled "MEDIA EXTRACTOR," filed Feb. 9, 2011; U.S. patent application Ser. No. 13/024,008, entitled "MEMORY MANAGEMENT UNIT," also filed Feb. 9, 2011; and U.S. patent application Ser. No. 13/024,016, entitled "STREAM IDENTIFIER HASH TABLE," also filed Feb. 9, 2011, all of which are incorporated herein by reference. The stream ID filter 163 may be implemented in FIG. 2 using the Cortex A8/TMS3206x with potential help from the FPGA. The stream ID filter 163 may be implemented in FIG. 3 using the ARM processor with potential help from the FPGA.

The network media adapter 100 may include an egress packet scheduler 168 to prioritize and schedule the different types of data (streaming, time synchronization, and other types of data such as asynchronous control data), and then send that data to the media interface 159 for final transmission over a physical or communication medium 170 of a network. The communication medium 170 is disclosed with reference to the media interface 159, which may also communicate with the network 130 wirelessly and thus may not be directly connected with a physical connection to the network 130. The QoS-compliant media interface 159 may transmit the encapsulated streaming data according to various protocols, e.g., 801.1Qat and 802.1Qav. This QoS-compliant media interface 159 also contains time stamping logic that enables implementation of precise network time synchronization and clock recovery. These aspects of the media interface 159 and other aspects of timing synchronization and syntonization of the network media adapter 100 will be further described later.

The network media adapter 100 may further include the ingress packet classifier 178, which is responsible for detecting different types of traffic received from the media interface 159 and routing the appropriate traffic type to a proper processing module. For example, the ingress packet classifier 178 may route media data classified as time synchronization traffic to a sync processor 180. The sync processor 180 may be configured to implement a precision synchronization protocol such as IEEE 802.1AS, which may ensure that a local real-time clock 182 of the QoS-compliant media interface 159 is synchronized to a network master clock and thereby enable the media clock recovery processor to syntonize or synchronize local media clocks to guarantee media data integrity of the media data. The ingress packet classifier 178 may also route media data classified as streaming packet traffic to the stream ID filter 163, which selects from multiple source streams those which the microcode engine 164 and the main processor 165 have approved to be processed and sent to one of the peripheral interfaces 104, and creates corresponding local media streams. The stream ID filter 163 may then route these local media streams to the stream packet decapsulator 162. Finally, the ingress packet classifier 178 may route all other general media data to a main processor 165 for general processing.

The streaming packet decapsulator 162 may decapsulate ingress packets of the local media streams and send an appropriate predetermined transport stream to the transport stream demultiplexer 156. If the incoming traffic is not a transport stream, the transport stream demultiplexer is bypassed internally (dashed lines) and A/V media data is routed for decryption and final processing. Transport stream packets may be routed to the transport stream demultiplexer 156 for processing. Lastly, the streaming packet decapsulator 162 may also extract time stamps as needed from the incoming media streams that are sent to a media clock recovery processor 188 for use in the media clock recovery process that will be discussed.

The Cortex A8/TMS3206x processor of FIG. 2 may be configured or programmed to execute the functionality of one or more of: the stream packet encapsulator and decapsulator 160 and 162; the main processor 165; and the media clock recovery processor 188. The ARM processor of FIG. 3 discussed previously may be configured or programmed to execute the functionality of one or more of: the stream packet encapsulator and decapsulator 160 and 162; the sync processor 180; the main processor 165; and the media clock recovery processor 188. The XMOS audio processor of FIG. 3 may be configured or programmed to execute the functionality of the media clock generation processor 129 and the media clock recovery processor 188 in addition to the functions of the other components displayed therein.

The transport stream demultiplexer 156 accepts standard transport stream packets and demultiplexes the multiple packetized element streams (PES). Each PES is then further processed to the elementary stream level and sent to the multi-context decryptor if needed. Unencrypted content bypasses the multi-context cryptographic decryptor 150. The multi-context cryptographic decryptor 150 is conceptually the same as the multi-context cryptographic encryptor 148 in that it supports multiple contexts but performs the inverse operation: decryption. Final output to the peripheral interfaces 104 occurs as data is naturally routed to one or more of the available peripheral interfaces.

The sync processor 180 implements the precision synchronization protocol, which may ensure that a local real-time clock 182 of the QoS-compliant media interface 159 is synchronized to a network master clock (not shown) accessible over the communication medium 170. The sync processor 180 may respond to synchronization packets, or sync messages, from the ingress packet classifier 178 and maintain a local real-time clock that tracks other nodes (e.g., sources and sink) on the network, thus ensuring network time synchronization. The sync processor 180 also may send sync packets, or sync messages, to the egress scheduler 168 to maintain the synchronization between the local real-time clock 182 and the network master clock. Example clock synchronization protocols that use sync messages include IEEE (Institute of Electrical and Electronics Engineers) 1588:2002 Standard for a Precision Clock Synchronization Protocol for Networked Measurement and Control Systems, and IEEE 802.1AS Precision Time Protocol (PTP) in IEEE 802.1AS Standard for Local and Metropolitan Area Networks—Timing and Synchronization for Time-Sensitive Applications in Bridged Local Area Networks. The synchronization performed by the sync processor 180 enables media clock recovery processor 188 to syntonize and synchronize media clocks and also ensures that media data samples are presented to the appropriate peripheral interface 104 at the right time, called presentation time.

Local media clocks are the clocks used by individual media peripheral interfaces 102 and 104 for sampling, transmitting, receiving, and framing media data. For example, a 44.1 kHz clock from a digital audio source would be considered the local media clock for that source. In order to transmit and receive A/V media data without audible or visible artifacts, the local media clocks of the media sources and sink are matched in frequency (syntonized) and phase (synchronized). A media clock recovery processor 188 implements this function within the network media adapter 100.

Media clock recovery is similar to the process of clock recovery from encoded data streams, but the fundamental mechanisms are somewhat different. With media clock recovery, local media streams contain time stamp information that can be used to calculate the media source clock frequency and phase. Additionally, local media clock frequency and phase information on the receiver can be calculated by using the local media clocks to generate time stamp events synchronously. The QoS-compliant interface 159 contains the local real-time clock 182 and the time stamp capture and event hardware 158 as noted earlier. The media clock recovery processor 188 takes the time stamp data received from the stream packet decapsulator 162, and the time stamps generated by the local media clocks, and calculates both phase and frequency offsets with which to control the media clock generation processor 129. These offsets may be used to control the local media clock generation processor 129 that generates the local media clocks such that the local media clocks are syntonized and synchronized to the source A/V media clock. Further examples of media clock recovery are described in U.S. patent application Ser. No. 12/874,836, entitled "MEDIA CLOCK RECOVERY," filed Sep. 2, 2010.

The QoS-compliant media interface 159 may further include an electronic media access control (MAC) 192 and one or more physical network interface connectors 194 corresponding to one or more types of networks such as Ethernet AVB, TCP/IP, MoCCA and the like. The electronic media access controller (EMAC) of the implementation of FIGS. 2 and 3 may be used to implement the functionality of the QoS-compliant media interface 159, to include a time stamp capture module 158, a real time clock 182, and the MAC 192. The network media adapter 100 may include memory such as the Flash memory 196 or the random access memory (RAM) 198 shown in FIG. 2, or other types of memory as discussed with reference to FIG. 4.

Figure 4:
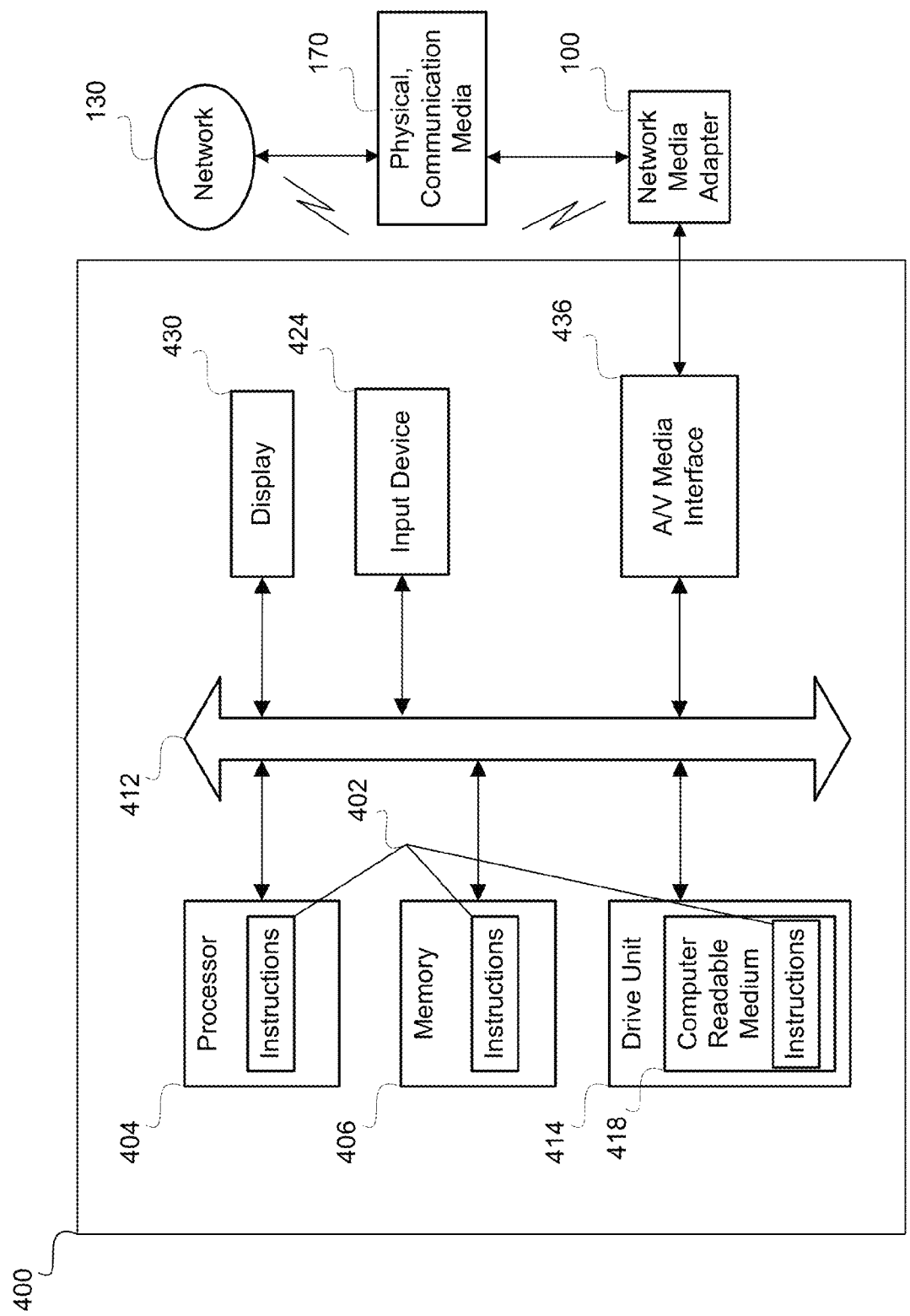
FIG. 4 is a general computer system, which may represent any of the computing devices referenced herein, including a computing device that may interface with the network media adapter.

FIG. 4 illustrates a general computer system 400, which may represent any other computing devices referenced herein, including a computing device that interfaces with the network media adapter 100 such as a BluRay player, a DVD player, cameras, computers, smart phones, stereos, recorders, and other such devices now existing or later developed. The computer system 400 may include an ordered listing of a set of instructions 402 that may be executed to cause the computer system 400 to exchange A/V media data with the network media adapter 100. The computer system 400 may be connected to or coupled with other computer systems or peripheral devices via the network 130. Herein, the phrase "coupled with" is defined to mean directly connected to or indirectly connected through one or more intermediate components. Such intermediate components may include both hardware and software based components, including the network 130 or network-related components.

In a networked deployment, the computer system 400 may operate in the capacity of a server or as a client-user computer in a server-client user network environment, or as a peer computer system in a peer-to-peer (or distributed) network environment. The computer system 400 may also be implemented as or incorporated into various devices, such as a personal computer or a mobile computing device capable of executing a set of instructions 402 that specify actions to be taken by that machine, including and not limited to, accessing the network 130 through any computer application. Further, each of the systems described may include any collection of sub-systems that individually or jointly execute a set, or multiple sets, of instructions to perform one or more computer functions.

The computer system 400 may include a processor 404, such as a central processing unit (CPU) and/or a graphics processing unit (GPU). The processor 404 may include one or more general processors, digital signal processors, application specific integrated circuits, field programmable gate arrays, digital circuits, optical circuits, analog circuits, combinations thereof, or other now known or later-developed devices for analyzing and processing A/V media data. The processor 404 may implement the set of instructions 402 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing or networked communication.

The computer system 400 may include a memory 408 on a bus 412 for communicating information. Code operable to cause the computer system to perform any of the acts or operations described herein may be stored in the memory 408. The memory 408 may be a random-access memory, read-only memory, programmable memory, hard disk drive or any other type of volatile or non-volatile memory or storage device.

The computer system 400 may also include a disk or optical drive unit 414. The disk drive unit 414 may include a computer-readable medium 418 in which one or more sets of instructions 402, e.g., software, can be embedded. Further, the instructions 402 may perform one or more of the operations as described herein. The instructions 402 may reside completely, or at least partially, within the memory 408 and/or within the processor 1804 during execution by the computer system 400.

The memory 408 and the processor 404 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 400 may include an input device 424, such as a keyboard or mouse, configured for a user to interact with any of the components of system 400, including user selections or menu entries of display menus. It may further include a display 430, such as a liquid crystal display (LCD), a cathode ray tube (CRT), or any other display suitable for conveying information. The display 430 may act as an interface for the user to see the functioning of the processor 404, or specifically as an interface with the software stored in the memory 408 or the drive unit 414.

The computer system 400 may include an A/V media interface 436 that enables A/V media data exchange with the network media adapter 100 via the communications network 130. The network 130 may include wired networks, wireless networks, or combinations thereof. The A/V media interface 436 may enable communications via any number of communication standards, such as Ethernet AVB, 802.11, 802.17, 802.20, WiMax, WiFi, MoCCa, or other communication standards.

The network media adapter 100 may be realized in hardware, software, or a combination of hardware and software. Any kind of computer system or other apparatus adapted for carrying out the methods described herein is suited, which may be a modification of FIGS. 2 and 3 or a significantly different implementation.

The network media adapter 100 may include any sort of memory including a computer-readable medium in which one or more sets of instructions, e.g., software, can be embedded to configure the network media adapter. The instructions may perform one or more operations as described herein. The instructions may reside completely or at least partially within the memory and may further reside in locations on the network 130 such as in memory or storage of any of the computer systems 400 to which the network media adapter is interfaced or with which the network media adapter communications over the network 130. Accordingly, the network media adapter 100 may be configured via a laptop or over the network 130.

The network media adapter may include one or more processors such as those discussed with reference to FIGS. 2 and 3 and/or other processors configured to execute the instructions. The memory and the processor also may be embodied on computer-readable media as that term was defined earlier with reference to FIG. 4. The processor(s) may include any hardware component that executes computer readable instructions. For example, the processor(s) may be a microcontroller, a soft core processor, an ASIC (application-specific integrated circuit), an FPGA (field programmable gate array), a CPLD (complex programmable logic device), a central processing unit of a computing device, a general processor, a digital signal processor, a digital circuit, an analog circuit, or any combination thereof. An example of the soft core processor includes MicroBlaze designed for Xilinx FPGAs from Xilinx™, a registered trademark of Xilinx, Inc of San Jose, Calif.

The network media adapter 100 may also be embedded at least in part in a computer program product, which includes all the features enabling the implementation of the operations described herein and which, when loaded in a computing device, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A network media adapter comprising:
a plurality of peripheral interfaces configured to be connected to connectors of a plurality of audio/video ("A/V") sources and sinks to respectively receive media data from the A/V sources, and to transmit media data to the A/V sinks;
a plurality of components coupled with at least some of the peripheral interfaces, at least a first subset of the plurality of components configured to syntonize or synchronize local media clocks of the A/V sources and sinks to ensure media data integrity affiliated with a protocol of a media network over which the media data is transported by generating a local media clock for media transmitted by the A/V sources based on one or more timestamps from incoming media streams transmitted by the A/V sources, the one or more timestamps being included in the incoming media streams and the incoming media streams also including at least A/V media data, and at least a second subset of the plurality of components including a classifier for routing incoming media data to one or more selected components of the plurality of components based on a traffic type of the incoming media data, the classifier routing incoming media data of a first type to a first component of the plurality of components and the classifier routing incoming media data of a second type to a second component of the plurality of components, the first component being different from the second component; and
a quality of service (QoS)-compliant media interface connectable to the media network and through which to send and receive processed A/V media data to and from the media network according to the protocol.

2. The network media adapter of claim 1, where the protocol comprises Ethernet Audio/Video Bridging and where the A/V media data is processed and sent to a networked A/V media device via the QoS-compliant media interface to be played according to the media data integrity affiliated with the protocol.

3. The network media adapter of claim 1, where the plurality of components comprises a sync processor to synchronize a local real time clock to that of a network master clock; the network media adapter further comprising a stream packet decapsulator and an ingress packet classifier, the ingress packet classifier configured to:
classify media data received through the QoS-compliant media interface from the media network;
route media data classified as time synchronization traffic to the sync processor to enable syntonization or synchronization of local media clocks to ensure media data integrity of the media data; and route media data classified as streaming packet traffic to a stream identification (ID) filter, the stream ID filter configured to:
  select from multiple source streams of the media data those approved to be processed;
  generate corresponding local media streams of the selected source streams; and
  send the local media streams to the stream packet decapsulator.

4. The network media adapter of claim 3, where the QoS-compliant media interface comprises time stamping logic to enable precise time synchronization and clock recovery.

5. The network media adapter of claim 4, where the plurality of components further comprises a media clock recovery processor, where the stream packet decapsulator is configured to: extract time stamps from the A/V media data being streamed from the media network; and send the time stamps to the media clock recovery processor.

6. The network media adapter of claim 5, where the plurality of components further comprises a media clock generation processor, where the media clock recovery processor is configured to:
  compare time stamps from the stream packet decapsulator with time stamps generated by a local media clock; and
  calculate frequency and phase offsets with which to control the media clock generation processor that syntonizes or synchronizes the local media clock with a source media clock, where the media clock recovery processor is also configured to operate in a media clock master mode to synchronize the time stamps to an external local media clock.

7. The network media adapter of claim 4, further comprising a media access controller coupled with a network interface, the network interface connectable to a communication medium through which to send and receive A/V media data to ensure media data integrity.

8. A network media adapter comprising:
  a plurality of peripheral interfaces configured to be connected to connectors of a plurality of audio/video ("A/V") sources and sinks;
  a plurality of first components to receive media data from one or more of the peripheral interfaces connected to the A/V sources, the first components configured to process, encapsulate, and transport over a media network the media data received from the A/V sources, the plurality of first components including a classifier for routing incoming media data to one or more selected components of the plurality of first components based on a traffic type of the incoming media data;
  a plurality of second components to receive media data from the media network, the second components configured to decapsulate, process, and transmit the media data through one or more peripheral interfaces connected to the A/V sinks;
  a plurality of third components configured to syntonize or synchronize local media clocks of the A/V sources and sinks to ensure media data integrity affiliated with a protocol of the media network; and
  a quality of service (QoS)-compliant media interface connectable to the media network and through which to send and receive processed A/V media data to and from the media network according to the protocol.

9. The network media adapter of claim 8, where the first components further comprise a multi-context cryptographic encryptor to encrypt the media data with one of a plurality of copy protection standards.

10. The network media adapter of claim 8, where the first components further comprise:
  a stream encapsulator to receive timestamp data from the QoS-compliant media interface and to encapsulate the media data into a media interface compliant packet stream; and
  an egress packet scheduler to schedule different types of data for transmission through the QoS-complaint media interface, the types of data including streaming data, time synchronization data, and various other types of data.

11. The network media adapter of claim 8, where the first components comprise:
  an audio encoder to compress raw audio from one or more of the A/V sources;
  a video encoder to compress raw video from the one or more of the A/V sources;
  a multi-context cryptographic encryptor to encrypt the compressed video and/or audio, when required, with one of a plurality of copy protection standards;
  a transport stream multiplexer to multiplex the compressed audio and the compressed video into a transport stream; and
  a stream encapsulator to receive timestamp data from the QoS-compliant media interface and to encapsulate the transport stream into a media interface compliant packet stream.

12. The network media adapter of claim 8, where the third components comprise a sync processor to synchronize the local media clocks with a network master clock; and where the second components comprise a stream packet decapsulator and an ingress packet classifier, the ingress packet classifier configured to:
  classify media data received through the QoS-compliant media interface from the media network;
  route media data classified as time synchronization traffic to the sync processor to enable syntonization or synchronization of local media clocks to ensure media data integrity of the media data; and
  route media data classified as streaming packet traffic to a stream identification (ID) filter, the stream ID filter configured to:
    select from multiple source streams of the media data those approved to be processed;
    generate corresponding local media streams of the selected source streams; and
    send the local media streams to the stream packet decapsulator.

13. The network media adapter of claim 12, where the second components further comprise a multi-context cryptographic decryptor; and a transport stream demultiplexer; where the stream packet decapsulator is configured to decapsulate ingress packets of the media data and to send the decapsulated media data to the transport stream demultiplexer when in a transport stream, to the multi-context cryptographic decryptor when encrypted but not in the transport stream, or to further downstream second components when neither in the transport stream nor encrypted.

14. The network media adapter of claim 13, where the transport stream demultiplexer is configured to:
  demultiplex a plurality of packetized elementary streams (PES) found within a stream of ingress packets; and
  process each respective of at least some of the PES down to an elementary stream, which are sent to the multi-context cryptographic decryptor when encrypted;

the multi-context cryptographic decryptor configured to decrypt each elementary stream with one of a plurality of copy protection standards.

15. The network media adapter of claims 13, where the second components further comprise:
an audio decoder configured to decompress into raw audio any compressed audio received from the stream packet decapsulator, the transport stream demultiplexer, or from the multi-context cryptographic decryptor and to send the raw audio to one or more of the peripheral interfaces connected to the A/V sinks; and
a video decoder configured to decompress into raw video any compressed video received from the stream packet decapsulator, the transport stream demultiplexer, or from the multi-context cryptographic decryptor, and to send the raw video to one or more of the peripheral interfaces connected to the A/V sinks.

16. The network media adapter of claim 13, where the multi-context cryptographic decryptor is configured to decrypt encrypted media data received from the stream packet decapsulator with one of a plurality of copy protection standards.

17. The network media adapter of claim 12, where the QoS-compliant media interface comprises time stamping logic to enable precise time synchronization and clock recovery, where the third components further comprise a media clock recovery processor, where the stream packet decapsulator is configured to:
extract time stamps from the media data as streamed from the media network; and
send the time stamps to the media clock recovery processor.

18. The network media adapter of claim 17, where the third components further comprise a media clock generation processor, where the media clock recovery processor is configured to:
compare time stamps from the stream packet decapsulator with time stamps generated by a local media clock; and
calculate frequency and phase offsets with which to control the media clock generation processor that syntonize or synchronize the local media clock with a source media clock.

19. The network media adapter of claim 17, further comprising a media access controller coupled with a network interface, the network interface connectable to a communication medium through which to send and receive A/V media data such as to ensure media data integrity.

20. A non-transitory computer-readable medium comprising a set of instructions for configuring a network media adapter that includes a plurality of peripheral interfaces configured to be connected to connectors of a plurality of audio/video ("A/V") sources and sinks, the set of instructions executable by a computing device having a processor and memory, the computer-readable medium comprising:
instructions to direct the processor to configure a plurality of first components to receive media data from the one or more peripheral interfaces connected to the A/V sources, the media data including A/V media data, the first components configured to process, encapsulate, and transport over a media network the media data received from the A/V sources, and the plurality of first components including a classifier for routing incoming A/V media data to one or more selected components of the plurality of first components based on a traffic type of the incoming media data;
instructions to direct the processor to configure a plurality of second components to receive media data from the media network, the second components configured to decapsulate, process, and transmit the media data through one or more peripheral interfaces connected to the A/V sinks;
instructions to direct the processor to configure a plurality of third components to syntonize or synchronize local media clocks of the A/V sources and sinks to ensure media data integrity affiliated with a protocol of the media network by comparing time stamps from at least the A/V media data received from the A/V sources with time stamps generated by a local media clock and calculating frequency and phase offsets with which to control the plurality of third components to syntonize or synchronize the local media clocks with a source media clock; and
instructions to direct the processor to configure a quality of service (QoS)-compliant media interface connectable to the media network and through which to send and receive processed A/V media data to and from the media network according to the protocol.

21. The computer-readable medium of claim 20, where the first components further comprise a multi-context cryptographic encryptor to encrypt the media data with one of a plurality of copy protection standards.

22. The computer-readable medium of claim 20, where the instructions to configure the first components further comprise:
instructions to direct the processor to configure a stream encapsulator to receive timestamp data from the QoS-compliant media interface and to encapsulate the media data into a media interface compliant packet stream; and
instructions to direct the processor to configure an egress packet scheduler to schedule different types of data for transmission through the QoS-complaint media interface, the types of data including streaming data, time synchronization data, and various other types of data.

23. The computer-readable medium of claim 20, where the instructions to configure the first components further comprise:
instructions to direct the processor to configure an audio encoder to compress raw audio from one or more of the A/V sources;
instructions to direct the processor to configure a video encoder to compress raw video from the one or more of the A/V sources;
instructions to direct the processor to configure a multi-context cryptographic encryptor to encrypt the compressed video and/or audio, when required, with one of a plurality of copy protection standards;
instructions to direct the processor to configure a transport stream multiplexer to multiplex the compressed audio and the compressed video into a transport stream; and
instructions to direct the processor to configure a stream encapsulator to receive timestamp data from the QoS-compliant media interface and to encapsulate the transport stream into a media interface compliant packet stream.

24. The computer-readable medium of claim 20, where the third components comprise a sync processor to synchronize the local media clocks with a network master clock; and where the second components comprise a stream packet decapsulator and an ingress packet classifier, the instructions to direct the processor to configure the ingress packet classifier to:
classify media data received through the QoS-compliant media interface from the media network;

route media data classified as time synchronization traffic to the sync processor to enable syntonization or synchronization of local media clocks to ensure media data integrity of the media data; and route media data classified as streaming packet traffic to a stream identification (ID) filter, the stream ID filter configured to:
- select from multiple source streams of the media data those approved to be processed;
- generate corresponding local media streams of the selected source streams; and
- send the local media streams to the stream packet decapsulator.

25. The computer-readable medium of claim 24, where the second components further comprise a multi-context cryptographic decryptor; and a transport stream demultiplexer; where the instructions instruct the processor to configure the stream packet decapsulator to decapsulate ingress packets of the media data and to send the decapsulated media data to the transport stream demultiplexer when in a transport stream, to the multi-context cryptographic decryptor when encrypted but not in the transport stream, or to further downstream second components when neither in the transport stream nor encrypted.

26. The computer-readable medium of claim 25, where the instructions are to direct the processor to configure the transport stream demultiplexer to:
- demultiplex a plurality of packetized elementary streams (PES) found within a stream of ingress packets; and
- process each respective of at least some of the PES down to an elementary stream, which are sent to the multi-context cryptographic decryptor when encrypted;
- the multi-context cryptographic decryptor configured to decrypt each elementary stream with one of a plurality of copy protection standards.

27. The computer-readable medium of claim 25, where the instructions to configure the second components further comprise:
- instructions to direct the processor to configure an audio decoder to decompress into raw audio any compressed audio received from the stream packet decapsulator, the transport stream demultiplexer, or from the multi-context cryptographic decryptor and to send the raw audio to one or more of the peripheral interfaces connected to the A/V sinks; and
- instructions to direct the processor to configure a video decoder to decompress into raw video any compressed video received from the stream packet decapsulator, the transport stream demultiplexer, or from the multi-context cryptographic decryptor, and to send the raw video to one or more of the peripheral interfaces connected to the A/V sinks.

28. The computer-readable medium of claim 25, where the instructions direct the processor to configure the multi-context cryptographic decryptor to decrypt encrypted media data received from the stream packet decapsulator with one of a plurality of copy protection standards.

29. The computer-readable medium of claim 24, where the QoS-compliant media interface comprises time stamping logic to enable precise time synchronization and clock recovery, where the third components further comprise a media clock recovery processor, where the instructions direct the processor to configure the stream packet decapsulator to:
- extract time stamps from the media data as streamed from the media network; and
- send the time stamps to the media clock recovery processor.

30. The computer-readable medium of claim 29, where the third components further comprise a media clock generation processor, where the instructions direct the processor to configure the media clock recovery processor to:
- compare time stamps from the stream packet decapsulator with time stamps generated by a local media clock; and
- calculate frequency and phase offsets with which to control the media clock generation processor that synchronizes and syntonizes the local media clock with a source media clock;

the computer-readable medium further comprising:
- instructions to direct the processor to configure a media access controller coupled with a network interface, the network interface connectable to a communication medium through which to send and receive A/V media data such as to ensure media data integrity.

31. The network media adapter of claim 1, where the plurality of components further comprises a media clock recovery processor configured to:
- compare time stamps from one or more of the plurality of components with time stamps generated by a local media clock; and
- calculate frequency and phase offsets with which to control a media clock generation processor that syntonizes or synchronizes the local media clock with a source media clock.

32. The network media adapter of claim 31, where the plurality of components further comprises the media clock generation processor, the media clock generation processor configured to apply the calculated frequency and phase offsets to the local media clock to syntonize or synchronize the local media clock with the source media clock.

33. The network media adapter of claim 8, where the third components further comprise a media clock recovery processor configured to:
- compare time stamps from one or more of the plurality of second components with time stamps generated by a local media clock; and
- calculate frequency and phase offsets with which to control a media clock generation processor that syntonizes or synchronizes the local media clock with a source media clock.

34. The network media adapter of claim 33, where the third components further comprise the media clock generation processor, the media clock generation processor configured to apply the calculated frequency and phase offsets to the local media clock to syntonize or synchronize the local media clock with the source media clock.

35. The non-transitory computer-readable medium of claim 20, further comprising instructions to:
- compare time stamps from one or more of the plurality of second components with time stamps generated by a local media clock;
- calculate frequency and phase offsets with which to control a media clock generation processor that syntonizes or synchronizes the local media clock with a source media clock; and
- control the media clock generation processor to syntonize or synchronize the local media clock with the source media clock by applying the calculated frequency and phase offsets.

* * * * *